United States Patent
Thomae (10) Patent No.: US 12,313,873 B2
(45) Date of Patent: May 27, 2025

(54) CONCEALED GRATING STRUCTURES

(71) Applicant: Carl Zeiss Jena GmbH, Jena (DE)

(72) Inventor: Daniel Thomae, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 240 days.

(21) Appl. No.: 17/764,847

(22) PCT Filed: Sep. 29, 2020

(86) PCT No.: PCT/EP2020/077167
§ 371 (c)(1),
(2) Date: Mar. 29, 2022

(87) PCT Pub. No.: WO2021/063910
PCT Pub. Date: Apr. 8, 2021

(65) Prior Publication Data
US 2022/0326427 A1  Oct. 13, 2022

(30) Foreign Application Priority Data

Sep. 30, 2019  (DE) .................... 10 2019 126 282.8
Sep. 30, 2019  (DE) .................... 10 2019 126 283.6

(51) Int. Cl.
*F21V 8/00*  (2006.01)
*G02B 27/44*  (2006.01)
(Continued)

(52) U.S. Cl.
CPC ......... *G02B 6/0036* (2013.01); *G02B 6/0016* (2013.01); *G02B 27/44* (2013.01); *G06F 3/013* (2013.01); *H04N 7/144* (2013.01)

(58) Field of Classification Search
CPC .... G02B 27/44; G02B 6/0035; G02B 6/0036; G02B 6/0016; G06F 3/013; H04N 7/144
See application file for complete search history.

(56) References Cited

U.S. PATENT DOCUMENTS 5,856,842 A * 1/1999 Tedesco ............. G02B 27/1086
  348/E7.08
7,418,170 B2  8/2008 Mukawa et al.
(Continued)

FOREIGN PATENT DOCUMENTS

AU        731744 B2 *  4/2001
DE  102012213685 A1   5/2014
DE  102016115938 A1 *  3/2018 ......... G02B 27/0081

OTHER PUBLICATIONS

International Search Report from corresponding International Patent Application No. PCT/EP20/77167, dated Dec. 21, 2020.
(Continued)

*Primary Examiner* — Michelle R Connelly
*Assistant Examiner* — Kirsten D. Endresen
(74) *Attorney, Agent, or Firm* — Renner, Otto, Boisselle & Sklar, LLP (57) ABSTRACT

A waveguide includes a partially transparent incoupling portion, having a decoupling portion spaced apart therefrom in the lateral direction, having a substantially transparent base body outside the incoupling and outcoupling portions. The transparent base body has front and rear sides, the wave guide having a diffractive incoupling structure in the incoupling portion and a decoupling structure in the decoupling portion, the diffractive incoupling structure configured to diffract radiation coming from an object and incident on the incoupling portion only in part such that the diffracted part propagates to the decoupling portion by reflections in the base body as incoupled radiation, The decoupling structure deflects part of the incoupled radiation such that the deflected part exits the base body in the decoupling portion via the front or rear side as decoupled radiation, and the diffractive incoupling structure has a diffractive efficiency (Continued)

which continually decreases toward one edge of the incoupling portion.

16 Claims, 3 Drawing Sheets

(51) Int. Cl.
    *G06F 3/01*         (2006.01)
    *H04N 7/14*       (2006.01)

(56) References Cited

U.S. PATENT DOCUMENTS

| | | |
|---|---|---|
| 8,223,204 B2 | 7/2012 | Hahn |
| 2005/0012842 A1 | 1/2005 | Miyagawa et al. |
| 2006/0132914 A1* | 6/2006 | Weiss .................... G02B 30/40 |
| | | 359/462 |
| 2010/0302344 A1 | 12/2010 | Large et al. |
| 2014/0140653 A1 | 5/2014 | Brown et al. |
| 2015/0205034 A1 | 7/2015 | Facke et al. |
| 2017/0205618 A1 | 7/2017 | Basset et al. |
| 2018/0081176 A1 | 3/2018 | Olkkonen et al. |

OTHER PUBLICATIONS

German Search Report (English-language translation) dated Feb. 21, 2020 from corresponding application No. DE102019126282.6.

* cited by examiner

CONCEALED GRATING STRUCTURES

CROSS-REFERENCE TO RELATED APPLICATIONS

This application is a national stage application, filed under 35 U.S.C. § 371, of International Patent Application No. PCT/EP2020/077167, filed Sep. 29, 2020, which claims priority to DE 10 2019 126 282.8 and DE 10 2019 126 283.6, both filed Sep. 30, 2019 Apr. 3, 2019, each of which is incorporated by reference herein in its entirety.

FIELD OF THE INVENTION

The present invention relates to a waveguide and to an image reproduction apparatus.

BACKGROUND OF THE INVENTION

A problem arising in videotelephony is that the respective interlocutors generally look at the display on which the interlocutor is displayed. However, the corresponding camera is usually installed on the edge of the display, away from the image reproduction area of the display. The interlocutors often perceive this as a lack of eye contact. Moreover, there is the need to also be able to use mobile image reproduction apparatuses for videotelephony.

Using this as a starting point, the present invention is based on the object of specifying a waveguide and an image reproduction apparatus which allow a more natural and more immersive conversation experience to be obtained.

SUMMARY OF THE INVENTION

This object is achieved by the subject matter of the main claim and the alternative independent claim. Advantageous configurations are specified in the dependent claims.

A waveguide comprising an input coupling portion, in particular a partly transparent input coupling portion, comprising an output coupling portion, in particular an output coupling portion spatially distant from the input coupling portion in the lateral direction, and comprising a main body that is substantially transparent outside of the input coupling portion and outside of the output coupling portion is proposed, the transparent main body having a front side and a back side, the waveguide having a diffractive input coupling structure in the input coupling portion, the waveguide having an output coupling structure in the output coupling portion, the diffractive input coupling structure being configured to only partially diffract radiation coming from an object to be detected and being incident on a front side of the waveguide in the input coupling portion such that the diffracted part, as input coupled radiation, propagates up to the output coupling portion in the main body by reflection, in particular total-internal reflection, the output coupling structure deflecting at least some of the input coupled radiation incident thereon, in such a way that the deflected part, as output coupled radiation, emerges from the main body in the output coupling portion via the front side or the back side of the main body, and the diffractive input coupling structure having a diffraction efficiency that decreases continuously, at least to an edge of the input coupling portion.

The waveguide can have a substantially planar shape. The terms front side and back side can denote the two faces of the planar waveguide which have the greatest area. Laterally can denote a direction substantially perpendicular to the front side and/or back side. An observer will look at the front side of the waveguide in substantially perpendicular fashion. The radiation coming from an object to be detected and incident on the front side of the waveguide, for example radiation coming from an observer, is only partially diffracted such that the diffracted part, as input coupled radiation, propagates in the main body up to the output coupling portion by reflection. Conversely, the diffractive input coupling structure in the input coupling portion also acts on radiation directed on the back side of the waveguide in the direction toward the observer. For an observer looking at the waveguide, the input coupling portion therefore appears obscured in relation to the remainder of the front side of the substantially transparent main body. As is yet to be described below, embodiments can provide for the diffractive input coupling structure to have a diffraction efficiency that continuously reduces toward the edge of the input coupling portion. This measure can design the transition from the obscured region to the remaining region of the waveguide to be softer, such that the obscuration is less visible to the observer. In this case, a continuously decreasing diffraction efficiency denotes a diffraction efficiency profile without visible jumps which could be perceived as bothersome by an observer. Diffraction efficiency denotes the ratio between the radiation that has been input coupled by diffraction and the radiation coming from the object to be detected and being incident on the front side of the waveguide in the input coupling portion.

In a first embodiment, the diffractive input coupling structure can have an imaging effect. The imaging effect may consist of radiation coming from the object to be detected and being incident on the front side of the waveguide in the input coupling portion being coupled into the waveguide as a plane wave. In particular, the imaging effect can be a converging effect. In this case, the diffractive input coupling structure can have a converging effect, especially in a sectional plane which is arranged perpendicular to the front side of the waveguide and which extends through the center of the input coupling portion and the center of the output coupling portion. By way of example, the imaging effect can be described by focal length $f_E$. In particular, the imaging effect can correspond to the converging effect of a cylindrical lens. The input coupling structure can also have a converging effect in more than one plane. By way of example, the focal length $f_E$ can be between 200 mm and 1000 mm, in particular between 300 mm and 800 mm, in order to input couple radiation from an object at a distance of approximately 200 mm to 1000 mm from the front side of the waveguide into the waveguide as a plane wave.

In a second embodiment, the diffractive input coupling structure has a diffraction efficiency of more than 0.1 (more than 10%) in a central portion of the input coupling portion. This may be sufficient to be able to detect the output coupled radiation emerging from the output coupling portion. Preferably, the diffraction efficiency of the diffractive input coupling structure is more than 0.2 (more than 20%) in the central portion. Particularly in the case of poor light conditions, for example twilight, a diffraction efficiency of more than 0.4 (more than 40%) in the central portion may be advantageous in order to steer a sufficient amount of light from an object to be detected to the output coupling portion.

In a further embodiment, the diffractive input coupling structure has a diffraction efficiency of less than 0.6 (less than 60%) in a central portion, or the central portion, of the input coupling portion. This may facilitate a minimization of the above-described obscuration effect and ensure a sufficient transmission of radiation directed from the back side of the waveguide in the direction toward the observer.

The diffraction efficiency of the diffractive input coupling structure at an edge of the input coupling portion can be near zero (0) in particular. This can further reduce the noticeability of the transition from the input coupling portion to the remaining region of the waveguide.

Further, an embodiment of the waveguide provides for the diffraction efficiency to have a Gaussian or super-Gaussian profile. In this case, a Gaussian profile is understood to be a profile that satisfies the following formula:

$$\eta(x) = Ae^{-\frac{(x-b)^2}{2c^2}}$$

A super-Gaussian profile is understood to mean a profile of the diffraction efficiency which satisfies the following formula:

$$\eta(x) = Ae^{-\left(\frac{(x-b)^2}{2c^2}\right)^P}$$

In this case, $\eta(x)$ denotes the diffraction efficiency $\eta$ as a function of location x.

The use of a super-Gaussian profile can ensure that a high diffraction efficiency that is as constant as possible is present over a broad region of the input coupling portion, with the diffraction efficiency reducing uniformly toward the edge of the input coupling portion at the same time.

In a further embodiment, the diffractive input coupling structure is embodied as a relief grating. Relief gratings can be manufactured particularly easily, allowing the production of the waveguide to be more cost-effective. Similarly, the output coupling structure can also be embodied as a relief grating. In this case, the input coupling structure and the output coupling structure may also be referred to as input coupling relief grating and output coupling relief grating, respectively.

To realize the imaging effect of the diffractive input coupling structure, the grating period may vary slightly but continuously over the input coupling portion.

In one exemplary embodiment, a profile depth of the input coupling grating reducing towards the edge leads to the diffraction efficiency that reduces toward the edge. The profile depth of the input coupling relief grating can easily be influenced during the production of the relief grating.

Alternatively or additionally, a profile shape of the input coupling relief grating changing toward the edge can also lead to the diffraction efficiency that reduces toward the edge. Using a changing profile shape, it may optionally be possible to advantageously influence the diffraction of the radiation that comes from the object to be detected but is not incident on the front side of the main body in perpendicular fashion.

In particular, the input coupling relief grating may comprise a blazed grating. In this case, a slope of the blazed grating changing toward the edge may lead to the diffraction efficiency that reduces toward the edge.

In principle, it is likewise conceivable to form the diffractive input coupling structure as a reflective or transmissive volume hologram. A diffraction efficiency that reduces toward the edge can then be obtained by a modulation of the refractive index that reduces toward the edge. Alternatively or in addition, a layer thickness of the volume hologram could also be varied in that case. In this case, the use of a material for the transmissive volume hologram which has a similarly high refractive index as the waveguide may lead to a high proportion of the diffracted part which propagates in the main body as input coupled radiation.

The diffractive input coupling structure and/or the output coupling structure may be formed as diffractive input coupling structure and output coupling structure, respectively, which are buried in the main body. Forming the diffractive input coupling structure and/or the output coupling structure on or in a surface of the main body was found to be particularly advantageous from a manufacturing point of view. Advantageously, the diffractive input coupling structure can be formed as an input coupling relief grating on the back side of the main body and/or the output coupling structure can be formed as an output coupling relief grating on the front side of the main body. Preferably, the input coupling relief grating and/or the output coupling relief grating is introduced directly into the highly refractive material of the main body and not as a separate polymer layer applied to the main body, in which the relief grating is molded. This can help reduce the number of process steps required to produce the waveguide. Moreover, radiation losses that almost unavoidably arise at interfaces between different materials can be avoided.

On its back side, the main body can be provided with an input coupling coating, at least in the input coupling portion, the material of said input coupling coating having a refractive index that is higher than the refractive index of the material used to manufacture the main body. In this case, the input coupling coating can be provided in particular on a surface of the input coupling relief grating. The input coupling coating may further increase the diffraction efficiency. Titanium dioxide, in particular, may be considered as material for the input coupling coating. This material can be particularly easily applied to a main body and has a high refractive index.

The layer thickness of the input coupling coating can vary within the input coupling portion in order to lead to the diffraction efficiency that reduces toward the edge of the input coupling portion. The diffraction efficiency can reduce in regions with a thinner coating.

The input coupling coating can be a vapor-deposited layer, in particular.

In a further embodiment, the main body is provided with an output coupling coating on its front side, at least in the output coupling region. The output coupling coating can facilitate output coupling of almost the entire input coupled radiation. In particular, the output coupling coating can be a metal coating, preferably an aluminum coating. To increase the mechanical and chemical durability of the metal coating, a dielectric protective layer can additionally be applied to the metal coating on the side facing away from the main body.

In another embodiment, provision is made for the main body to be manufactured from a polymer with a refractive index greater than or equal to 1.50, in particular greater than or equal to 1.60, in particular greater than or equal to 1.74. In this case, the refractive indices relate to a wavelength of 546.07 nm (e line). Slightly different refractive indices may arise at other wavelengths.

Such polymers are also known as high refractive index polymers (HRIPs). In particular, the main body may be produced from an episulfide resin. By way of example, the main body may be produced from a material that is commercially available from Mitsui Chemicals, Inc. under the trade name MR-174°.

In contrast to the use of the glass for the main body, the choice of a polymer allows the provision of a lighter main body. Consequently, this is also better suited to the use in a mobile image reproduction apparatus.

Further, as a matter of principle, the largest possible angular range in which total internal reflection conditions are satisfied within the main body is desirable in order to be able to use the input coupling structure to input couple radiation coming from the object over a large angular range. The use of a polymer with a refractive index greater than 1.6 for the main body may allow the choice of a non-gaseous material to adjoin the main body, in front of and behind the main body, without breaking the total internal reflection conditions. This can further simplify the structural design of the waveguide.

If a polymer with a refractive index greater than 1.74 is used for the main body, an angular range for total internal reflection almost corresponding to the material sequence of air-glass-air can be obtained, even in the case of a non-gaseous material adjoining the main body. Typically, an air gap in front of the main body can hardly be realized in mobile image reproduction apparatus since a contact sensor, for example a touchpad, still is regularly arranged in front of the waveguide. When the contact sensor is touched a force that cannot be dissipated by the air gap is exerted on the touch sensor. Accordingly, the touch sensor must have a very robust and hence heavy design so that arising forces can be dissipated via edges of the touch sensor. The above-described waveguide consequently allows the production of a lighter mobile image reproduction apparatus comprising a touch sensor.

The input coupling relief grating and/or the output coupling relief grating can be produced in the main body by reshaping the main body. By way of example, the input coupling relief grating and/or the output coupling relief grating can be introduced into the main body by hot stamping. This can be implemented very easily by means of a stamp which has a surface structure complementary to the input coupling relief grating or output coupling relief grating. In this case, a planar main body made of a high refractive index polymer can be used as an initial material, which can be manufactured easily and in high quality with a uniformly present high transparency. In contrast to a main body produced from glass, an input coupling relief grating can easily be impressed into a main body manufactured from a high refractive index polymer.

It is likewise conceivable to introduce the input coupling relief grating and/or the output coupling relief grating into the main body by way of at least one etching process. To this end, a mask can initially be applied to the main body, material of the main body can subsequently be removed by way of an etching process, in particular a directed etching process (e.g., sputtering) for the purposes of producing the input coupling relief grating or output coupling relief grating, and the etching mask can finally be removed.

In this case, only planar material for the main body need be provided.

Alternatively, the main body can be produced together with the input coupling relief grating and/or with the output coupling relief rating by reshaping. By way of example, the main body with the input coupling relief grating and/or with the output coupling relief grating can be produced by injection molding. In this case, the input coupling relief grating or the output coupling relief grating can be designed by the use of the mold which has a surface structure that is complementary to the input coupling relief grating or output coupling relief grating.

It is also conceivable to form for example the output coupling relief grating during the primary shaping of the main body and to subsequently form the input coupling relief grating by reshaping the main body. Likewise, the input coupling relief grating may initially be produced during the primary shaping of the main body and the pre-manufactured main body may subsequently be provided with the output coupling grating by reshaping.

According to a further embodiment, provision is made for a back side adhesive laminate with at least one first back side adhesive layer to be arranged on the back side of the main body and/or of the input coupling coating, and for the first back side adhesive layer to be arranged on the side of the back side adhesive laminate that faces the main body. The back side adhesive laminate may only consist of the first back side adhesive layer in this case.

The first back side adhesive layer may be produced from a material with a refractive index of less than or equal to 1.329, in particular less than or equal to 1.324, preferably less than or equal to 1.319, in order to improve that of the input coupled radiation in the main body.

Further, the back side adhesive laminate may have a second back side adhesive layer, with the second back side adhesive layer being arranged on the side of the first back side adhesive layer facing away from the main body and with the second back side adhesive layer being produced from a material with a refractive index that is greater than the refractive index of the material from which the first back side adhesive layer is produced.

In particular, the second backside adhesive layer may serve to connect the waveguide to a further element and in the process compensate stresses on account of different coefficients of thermal expansion of the first backside adhesive layer and of the further element.

The first backside adhesive layer can be manufactured from an adhesive that was in liquid form when it came into contact with the main body and/or the input coupling coating. By way of example, the adhesive may simply be applied to the pre-manufactured main body and subsequently be cured, for example by UV radiation or heat. In particular, this may be implemented after the waveguide has been connected to the further element using the still liquid adhesive. Alternatively, provision can also be made of a liquid adhesive which cures after a certain amount of time. By way of example, such adhesives may comprise two component adhesives.

In another embodiment, a front side adhesive laminate may also be arranged on the front side of the main body. The front side adhesive laminate may likewise comprise a first front side adhesive layer and/or a second front side adhesive layer. In particular, the first front side adhesive layer may be manufactured from the same material as the first back side adhesive layer and the second front side adhesive layer may be manufactured from the same material as the second back side adhesive layer. The first front side adhesive layer is typically likewise arranged on the side of the front side adhesive laminate facing the main body. The front side adhesive laminate may also consist of the first front side adhesive layer only.

The first back side adhesive layer and/or the second back side adhesive layer may in particular be produced from a polymer which consists of 1 to 15% by wt. aliphatic urethane acrylate and 85 to 99% by wt. acrylic monomer. Examples of such polymers are obtainable under the trade name Norland Optical Adhesive 1315 (Trade code: NOA 1315), Norland Optical Adhesive 132 (Trade code: NOA 132) and Norland Optical Adhesive 1327 (Trade code: NOA 1327) from Norland Products Inc.

Further, an image reproduction apparatus with an above-described waveguide is proposed, the apparatus comprising a display with an image reproduction area, the display being connected to the display by means of the back side adhesive laminate, the output coupling portion being arranged outside of the reproduction area of the display and the input coupling portion being arranged within the image reproduction area of the display.

In particular, the display can be a transmissive display or a reflective display. Examples of the displays that come into question specified here include LCD displays and OLED displays.

In one embodiment of the image reproduction apparatus, the image reproduction apparatus comprises a camera arranged outside of the image reproduction area, the camera having at least one sensor for capturing the output coupled radiation. By way of example, the camera can be attached next to the display on the back side of the waveguide.

By way of example, the camera sensor can be a CMOS sensor or a CCD sensor. Further, the camera may comprise a lens.

Outside of the image reproduction area, a beam trap can be applied to the front side and/or the back side of the waveguide, between the display and the output coupling portion. The beam trap can minimize the risk of light from the display reaching the camera sensor.

The image reproduction apparatus can be, in particular, a smart phone, a tablet computer, a desktop computer, a notebook computer, a video phone or a terminal of an intercom system.

BRIEF DESCRIPTION OF THE DRAWINGS

Below, the invention is explained in more detail on the basis of exemplary embodiments, with reference being made to the drawings. In the figures.

DETAILED DESCRIPTION OF THE INVENTION

Figure 1:
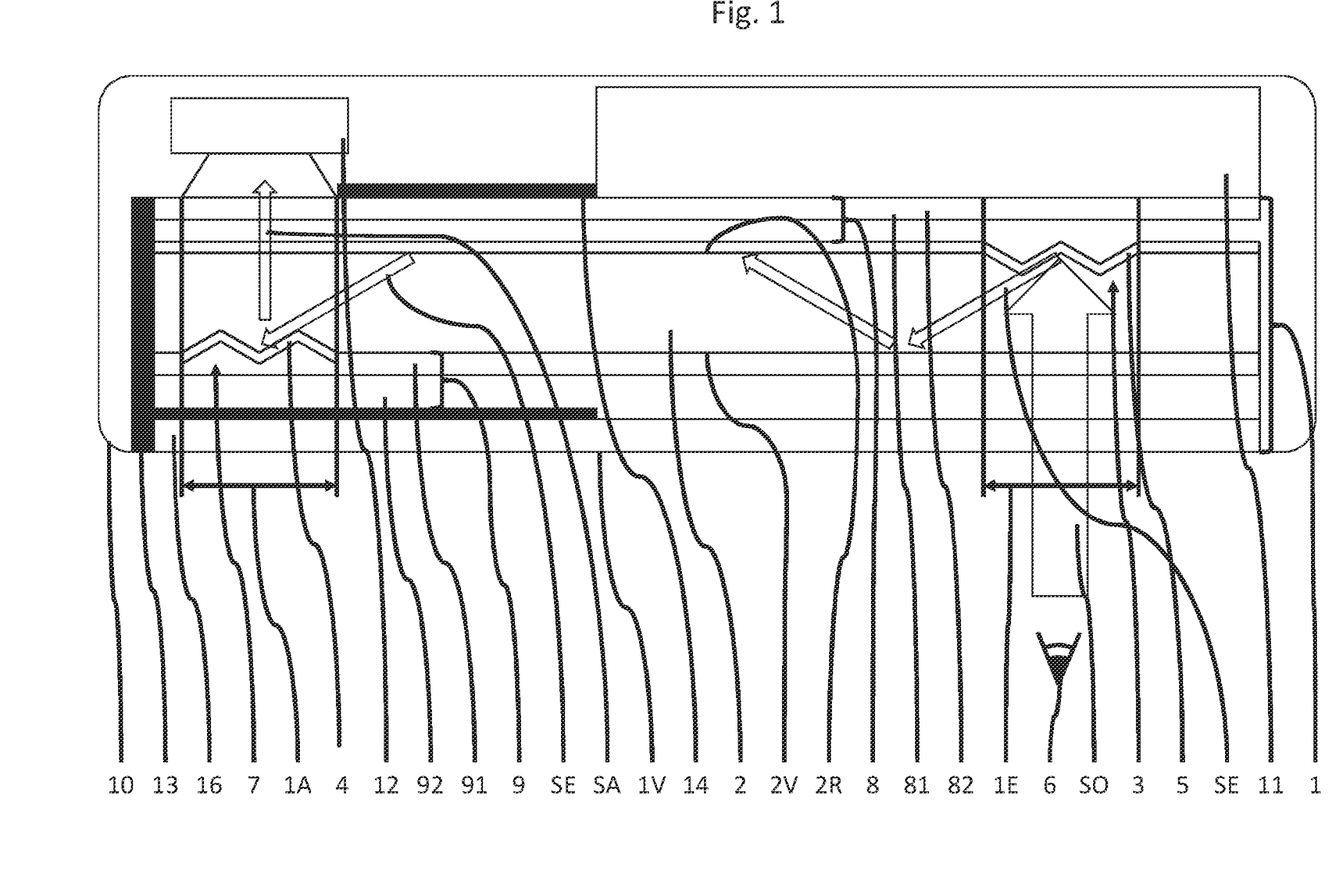
FIGS. 1 and 2 show a side view of an embodiment of the image reproduction apparatus.

FIG. 1 shows an image reproduction apparatus 10. In the exemplary embodiment shown, the image reproduction apparatus 10 is a smartphone. The image reproduction apparatus 10 comprises a waveguide 1. The waveguide has a partly transparent input coupling portion 1E and an output coupling portion 1A spatially distant from the input coupling portion 1E in the lateral direction.

The main body is substantially transparent outside of the input coupling portion 1E and outside of the output coupling portion 1A. In this context, substantially transparent means that light from the back side 2R of the main body can reach an observer 6 arranged in front of the front side 2V unimpeded. In particular, substantially transparent may mean that light from an image reproduction area of a display 11 can reach the observer 6. Relatively small non-transparent regions may be provided, for example for mechanically fastening the main body 2. In its input coupling portion, the waveguide 1 has a diffractive input coupling structure 3.

In the exemplary embodiment shown, the diffractive input coupling structure 3 is embodied as an input coupling relief grating 3. The very schematically shown input coupling relief grating 3 is a blazed grating.

The main body 2 may be manufactured from a high refractive index polymer, for example. The input coupling relief grating can then be introduced into a surface, in particular the back side 2R of the main body 2. By way of example, this can be implemented by hot stamping by means of a stamp which has a surface structure complementary to the input coupling relief grating.

Further, the waveguide 1 has the output coupling portion 1A of an output coupling structure 4. The output coupling structure 4 is also embodied as a relief grating, specifically as an output coupling relief grating.

The diffractive input coupling structure 3 is configured to only diffract some radiation coming from an object 6 to be detected, the observer 6 in the present case, and being incident on a front side 1V of the waveguide 1 in the input coupling portion 1E, in such a way that the diffracted part, as input coupled radiation SE, propagates up to the output coupling portion 1A in the main body 2 by reflection.

The output coupling structure 4 steers at least some of the input coupled radiation SE incident thereon such that the deflected part, as output coupled radiation SA, emerges from the main body 2 in the output coupling portion 1A via the back side of the main body 2. In principle, it is likewise conceivable for the output coupled radiation SA to emerge via the front side 2V of the main body.

Transmitting some of the radiation SO from the object 6 incident on the waveguide 1 in the input coupling section 1E to the output coupling portion 1A via the input coupling structure 3 and the main body 2 may also be referred to as a periscope function.

An input coupling coating 5 is provided on the back side 2R of the main body 2. The refractive index of the material of the input coupling coating 5 is higher than the refractive index of the material from which the main body 2 has been manufactured. In this case, the input coupling coating 5 extends not over only the input coupling relief grating 3 but over the entire back side 2R of the main body 2.

The waveguide 1 further has a back side adhesive laminate 8 which is arranged on the input coupling coating 5. The back side adhesive laminate 8 comprises a first back side adhesive layer 81 on the side of the back side adhesive laminate 8 facing the main body 2. The first back side adhesive layer is produced from a material with a refractive index of less than 1.48, more precisely from a material with a refractive index less than or equal to 1.315.

In conjunction with the use of a material for the main body 2 with a refractive index of 1.74, the use of a first back side adhesive layer made of a material with a refractive index less than or equal to 1.315 facilitates an angular range usable for total internal reflection of 49.1° to 90°. This almost corresponds to an angular range of a waveguide which is manufactured from glass and adjoins air.

Further, the back side adhesive laminate 8 has a second back side adhesive layer 82. The material of the second back side adhesive layer is preferably chosen such that it is able to compensate thermally caused stresses due to different coefficients of thermal expansion of the elements connected via the back side adhesive laminate 8.

The waveguide 1 is connected to a display 11 by means of the backside adhesive laminate 8. In the present case, the display 11 is an OLED display. However, it is likewise possible to use an LCD display. On account of the transparency of the main body 2, an observer 6 can perceive the image displayed by the display 11. At the same time, the radiation coming from the observer 6 is input coupled into the main body 2 by the input coupling structure 3, is propagated to the output coupling structure 4 and is output coupled there again.

The back side of the output coupling structure 4, that is to say the back side of the output coupling relief grating 4, is provided with an output coupling coating. The output coupling coating 7, which can be a metal coating, in particular an aluminum coating, ensures that the greatest proportion of radiation possible is output coupled. The output coupled radiation SA can be detected by the sensor of the camera 12. In addition to the sensor, the camera in this case additionally comprises an imaging optical unit, only indicated, between the output coupling structure 4 and the sensor. Consequently, the direction in which the observer 6 perceives the image displayed by the display 11 and the direction from which the observer 6 is recorded by the camera 12 correspond to one another. Consequently, a more natural conversation experience arises for the observer.

A front side adhesive laminate 9 which also covers the output coupling coating 7 is provided on the front side 2V of the main body 2. In a manner corresponding to the back side adhesive laminate 8, the front side adhesive laminate 9 likewise comprises a first front side adhesive layer 91 and a second front side adhesive layer 92. In this case, the first front side adhesive layer 91 can be manufactured from the same material as the first back side adhesive layer 81. In particular, this can maintain the total internal reflection properties of the waveguide 1. In contrast thereto, the second front side adhesive layer 92 can be manufactured from a material that simplifies the connection to further elements.

In the present case, a touch sensor 16 is provided in front of the front side adhesive laminate 9. It can serve to operate the image reproduction apparatus 10. However, as a matter of principle, a simple transparent covering plate, e.g., made of glass, may be provided instead of the touch sensor 16 in order to protect the waveguide 1 from external influences.

A beam trap 14 and 15 is respectively attached to the front side and the back side of the waveguide 1, in the lateral direction between the display 11 and the output coupling portion 1A. The beam traps 14 and 15 prevent light from the display from being able to reach the sensor of the camera 12 by way of reflections such that the camera 12 preferably only detects the light coming from the observer 6. Beam traps that have the same object and are formed as a light-absorbing coatings 13 and 17 in the present case are provided laterally on the end sides of the main body 1. Further, the input coupling grating structure 3 is optimized to diffract the light, which emanates from the display 11 and is likewise unavoidably diffracted at the input coupling structure 3, in a direction substantially pointing away from the output coupling portion 1A, that is to say to the right in FIGS. 1 and 2. In particular, the beam trap/light-absorbing coating 17 can reduce the back-reflection at that end of the waveguide 1/main body 2 to a minimum.

Radiation SO coming from the object to be detected, the observer 6, is only partly diffracted into the waveguide 1, as input coupled radiation SE, by means of the input coupling structure 3 in the input coupling portion 1E of the waveguide 1. The input coupled radiation 1E is subsequently guided in the waveguide 1 by total internal reflection.

In this case, the ratio of power of the input coupled radiation SE to that of all of the radiation SO coming from the observer 6 is 1:10 in the exemplary embodiment shown. This is also indicated by virtue of the arrows for the input coupled radiation SE being depicted with only one tenth of the width of the arrow for all of the radiation SO coming from the observer 6.

FIG. 2 once again shows the image reproduction apparatus 10 already depicted in FIG. 1, with a few reference signs having been omitted for the sake of clarity.

Figure 2:
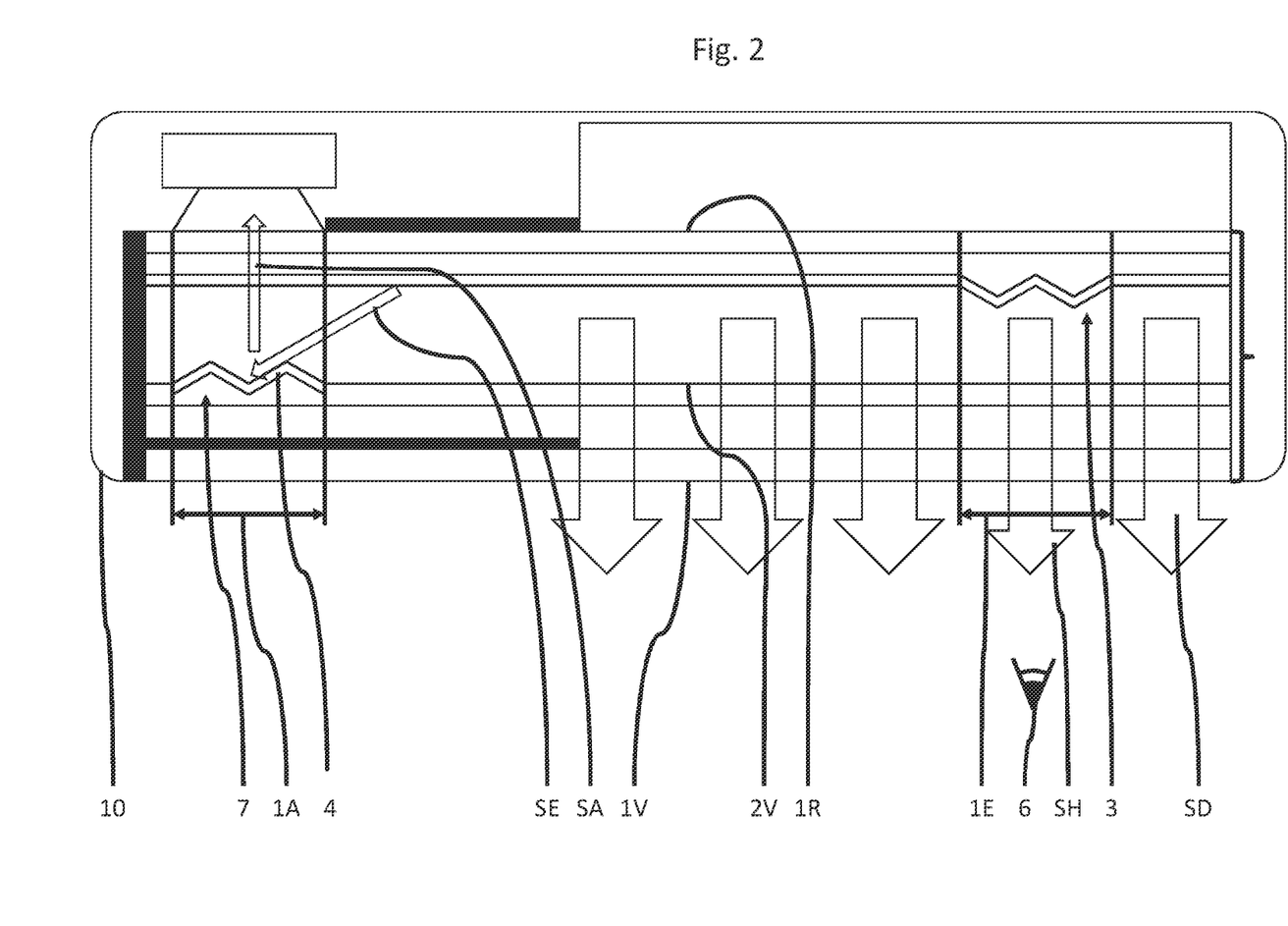

In contrast to FIG. 1, FIG. 2 depicts the radiation SD, SH which was emitted by the display and perceived by the observer 6 via the transparent waveguide 1.

The effect of the input coupling structure 3 is not restricted to radiation SO coming from the observer 6. Rather, the input coupling structure 3 in the input coupling portion 1E also reduces the transmission of radiation in the direction toward the observer 6 from an object behind the waveguide 1. In the case of uniform illumination by the display 11 located behind the waveguide 1, the radiation SH, perceived by the observer 6, in the input coupling portion 1E is reduced. Once again, this is depicted by an arrow with a reduced width.

In contrast to the usual optimization of a blazed grating in view of maximum efficiency in respect of used orders of diffraction, the input coupling relief grating 3 embodied as a blazed grating may be optimized to minimize the component of light coming from the display 11 which is diffracted in the direction of the output coupling structure 4.

The ratio of the difference between the radiation SD coming from the display and the power SH emerging from the waveguide 1 in the input coupling portion 1E in the direction of the observer 6, and the radiation SD coming from the display 11 can, to a first approximation, in this case substantially correspond to the ratio between the input coupled radiation SE and the radiation SO coming from the object 6.

The greater the component of input coupled radiation SE in relation to the radiation SO coming from the object 6, the more the image depicted by the display 11 is obscured in the input coupling portion.

The local obscuration effect by the diffractive input coupling structure 3 is compensated by virtue of the image to be depicted on the display 11 being darkened for all points located outside of the input coupling portion 1E in relation to the points located within the input coupling portion 1E. This is depicted in FIG. 3.

Figure 3:
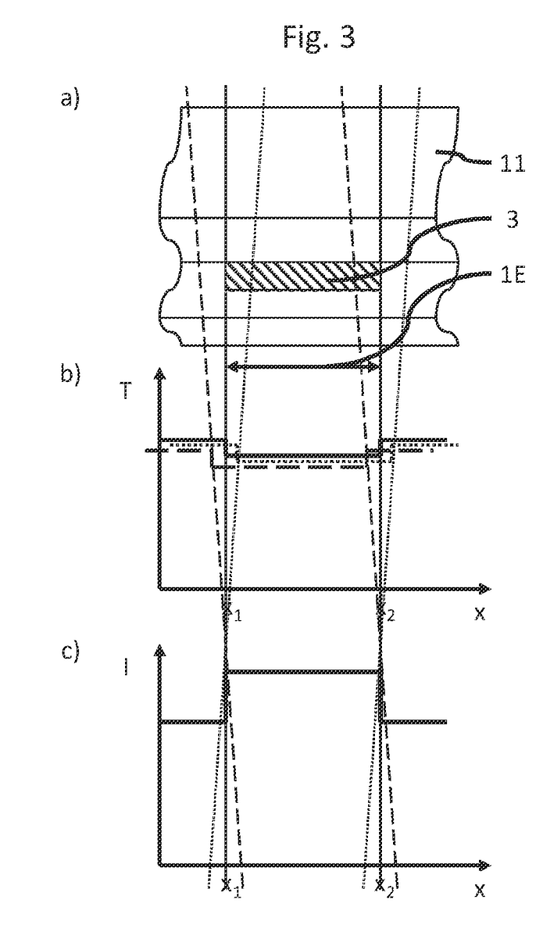
FIG. 3 shows a transmission profile and an intensity profile around the input coupling portion.

FIG. 3a) depicts a portion of the display 11 and of the waveguide 1 with the diffractive input coupling structure 3 around the input coupling portion 1E. The diffraction efficiency n of the input coupling structure 3 has a constant value over the entire input coupling portion 1E in this case.

FIG. 3b) schematically illustrates the curve of the transmission T of the waveguide 1 as a function of location X. The transmission from the display 1 to the front side 1V of the waveguide 1 is reduced between $x_1$ and $x_2$ on account of the diffractive input coupling structure 3. The transmission can be 90% (0.9), for example, outside of this input coupling portion 1E and 80% (0.8) within the input coupling portion 1E, that is to say between $x_1$ and $x_2$.

FIG. 3c) reproduces the intensity I of the radiation emitted by the display 11 in the region of the input coupling portion 1E. By way of example, the intensity is 100% (1) between points $x_1$ and $x_2$. It is reduced to approximately 88.8% (0.888) outside of this region. Consequently, the image depicted by the display 11 appears homogenous to an observer 6 gazing perpendicularly on the image reproduction apparatus 10 or the display 11.

However, if the observer 6 does not look at the display 11 in perpendicular fashion, the region obscured by the input coupling structure 3 is displaced in relation to the display 11 and the image depicted thereby since the input coupling structure 3 and the display 11 are not located in one plane. This is indicated in FIG. 3b) using dashed and dotted lines.

In the edge region of the input coupling portion 1E, the compensation of the obscuration effect of the diffractive input coupling structure 3 carried out for a certain viewing angle is not effective for other viewing angles. Rather, there are significant brightness variations in the edge region of the input coupling portion 1E, which may be perceived as bothersome by the observer 6. The brightness variations occurring for different viewing angles may also be referred to as parallax errors. They may also occur if the observer 6 gazes perpendicularly on the image reproduction apparatus 10 but from a relatively small distance, since in this case each eye of the observer 6 is directed at the input coupling portion 1E from a slightly different angle.

Figure 4:
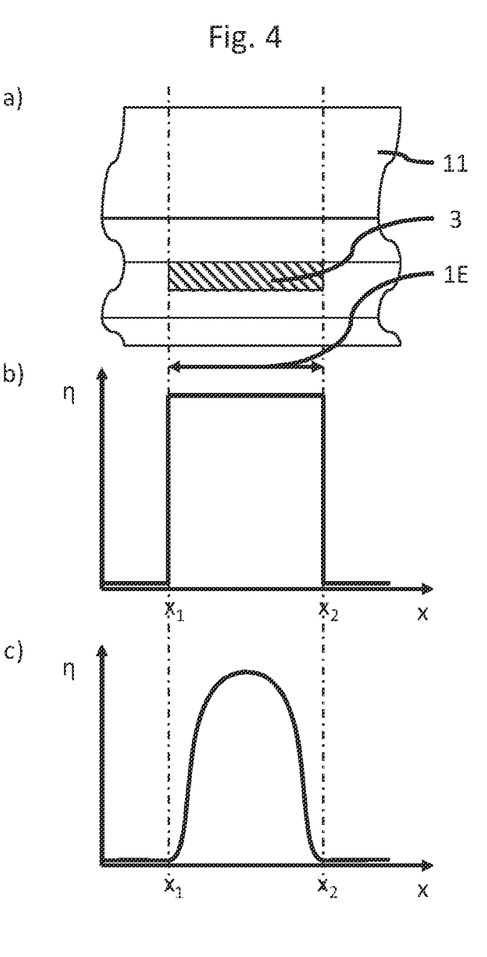
FIG. 4 shows diffraction efficiency profiles around the input coupling portion.

FIG. 4a) once again depicts a portion of the image reproduction apparatus 10 in the region of the input coupling portion 1E. FIG. 4b) depicts the diffraction efficiency η of the diffractive input coupling structure 3, as forms the basis of the explanations in relation to FIG. 3. It has a constant value between points $x_1$ and $x_2$. By way of example, this value of the diffraction efficiency η may be 10% (0.1). If, as shown in FIG. 4c), the diffraction efficiency η of the diffractive input coupling structure 3 continuously reduces from a maximum value of 10% (0.1) in the center between the locations $x_1$ and $x_2$ toward the edge of the input coupling portion 1E, then the value of the transmission Tin the input coupling portion 1E approaches the value outside of the input coupling portion 1E as a result, and so a brightness jump can hardly still be perceived by the observer 6, even in the case of different viewing angles.

Consequently, the obscuration effect by the diffractive input coupling structure 3 can be compensated by a uniform adjustment of the intensity of the radiation SD emitted by the display 11 without perceivable brightness variations occurring in the edge region of the input coupling portion 1E in the case of changing viewing angles. This may be found to be advantageous, particularly when the diffractive input coupling structure 3 is not provided on the back side 2R of the main body 2 but provided as a buried input coupling structure within the main body 2. A viewing angle dependence of the compensation can be particularly noticeable in the case of a buried input coupling structure 3 since the distance between the diffractive input coupling structure 3 and the display 11 is typically greater than in the case of a diffractive input coupling structure 3 arranged on the back side 2R of the main body 2.

As a result, the proposed embodiment of the image reproduction apparatus 10 allows the diffractive input coupling structure 3 to not be perceived by an observer 6, and consequently this can also be referred to as a concealed grating structure.

In particular, the present disclosure also relates to the following examples:

Example 1. A waveguide
comprising an input coupling portion,
comprising an output coupling portion,
comprising a main body that is substantially transparent outside of the input coupling portion and outside of the output coupling portion,
the transparent main body having a front side and a back side,
the waveguide having a diffractive input coupling structure in the input coupling portion,
the waveguide having an output coupling structure in the output coupling portion,
the input coupling structure being configured to only partially diffract radiation coming from an object to be detected and being incident on the front side in the input coupling portion such that the diffracted part, as input coupled radiation, propagates up to the output coupling portion in the main body by reflection,
the output coupling structure deflecting at least some of the input coupled radiation incident thereon, in such a way that the deflected part, as output coupled radiation, emerges from the main body in the output coupling portion via the front side or the back side of the main body,
the main body being manufactured from a polymer with a refractive index greater than or equal to 1.50, in particular greater than or equal to 1.60, in particular greater than or equal to 1.74.

Example 2. The waveguide according to example 1, wherein
the diffractive input coupling structure has an imaging, more particularly converging effect.

Example 3. The waveguide according to example 1 or 2, wherein the diffractive input coupling structure is embodied as an input coupling relief grating, and/or
the output coupling structure is embodied as an output coupling relief grating.

Example 4. The waveguide according to example 3, wherein the input coupling relief grating and/or the output coupling relief grating is produced in the main body by a reshaping of the main body.

Example 5. The waveguide according to either of the preceding examples 3 and 4,
wherein the input coupling relief grating and/or the output coupling relief grating are introduced into the main body by hot stamping and/or by an etching process.

Example 6. The waveguide according to any one of the preceding examples,
wherein the main body is produced together with the input coupling relief grating and/or together with the output coupling relief grating by primary shaping.

Example 7. The waveguide according to any one of the preceding examples,
wherein the main body with the input coupling relief grating and/or with the output coupling relief grating is produced by injection molding.

Example 8. The waveguide according to any one of the preceding examples,
wherein the main body is provided with an input coupling coating on its back side, at least within the input coupling portion,
the refractive index of the material of the input coupling coating is greater than the refractive index of the material used to manufacture the main body.

Example 9. The waveguide according to any one of the preceding examples,
wherein the main body is provided with an output coupling coating on its front side at least within the output coupling portion.

Example 10. The waveguide according to any one of the preceding examples,
wherein a back side adhesive laminate with at least one back side adhesive layer is arranged on the back side of the main body and/or the input coupling coating,
the first back side adhesive layer is arranged on the side of the back side adhesive laminate that faces the main body, the first back side adhesive layer is produced from a material with a refractive index of less than 1.48, in particular less than or equal to 1.315.

Example 11. The waveguide according to example 10, wherein the back side adhesive laminate has a second back side adhesive layer,
the second back side adhesive layer is arranged on the side of the first back side adhesive layer facing away from the main body,
the second back side adhesive layer is produced from a material with a refractive index that is greater than the refractive index of the material used to produce the first back side adhesive layer.

Example 12. The waveguide according to either of the preceding examples 10 and 11,
wherein the first back side adhesive layer is manufactured from an adhesive that was in liquid form when it came into contact with the main body and/or the output coupling coating.

Example 13. The waveguide according to any one of the preceding examples,
wherein a light-absorbing coating is provided on at least one end side of the main body.

Example 14. A stamp for introducing an input coupling relief a grating and/or an output coupling relief grating into a main body for manufacturing a waveguide according to any one of examples 4 to 7.

Example 15. An injection mold insert for an injection mold for the injection molding of a main body with an input coupling relief grating and/or an output coupling relief grating for manufacturing a waveguide according to example 6 or 7.

Example 16. An image reproduction apparatus,
wherein the image reproduction apparatus comprises a waveguide according to any one of the preceding examples 10 to 13,
the image reproduction apparatus comprises a display with an image reproduction area,
the display is connected to the waveguide by means of the backside adhesive laminate,
the output coupling portion is arranged outside of the image reproduction area of the display,
the input coupling portion is arranged within the image reproduction area of the display.

Example 17. The image reproduction apparatus according to example 16,
wherein the image reproduction apparatus comprises a camera arranged outside of the image reproduction area,
the camera has at least one sensor for capturing the output coupled radiation.

Example 18. The image reproduction apparatus according to either of the preceding examples 16 and 17,
wherein outside of the image reproduction area, a beam trap is applied on the front side and/or the back side of the waveguide, between the display and the output coupling portion.

Example 19. The image reproduction apparatus according to any one of the preceding examples 16 to 18,
wherein the image reproduction apparatus is a smartphone, a tablet computer, a desktop computer, a notebook computer, a video phone or a terminal of an intercom system.

REFERENCE SIGNS

1 Waveguide
1E Input coupling portion
1A Output coupling portion
1R Back side of the waveguide
1V Front side of the waveguide
2 Main body
2V Front side of the main body
2R Back side of the main body
3 Diffractive input coupling structure, input coupling relief grating
4 Output coupling structure, output coupling relief grating
5 Input coupling coating
6 Object, observer
7 Output coupling coating
8 Back side adhesive laminate
81 First back side adhesive layer
82 Second back side adhesive layer
9 Front side adhesive laminate
91 First front side adhesive layer
92 Second front side adhesive layer
10 Image reproduction apparatus, smartphone
11 Display
12 Camera
13,17 Light-absorbing coating
14,15 Beam trap
16 Touch sensor
SE Input coupled radiation
SA Output coupled radiation
SO Radiation coming from the object 6
SD Radiation emitted by the display 11 and perceived by the observer 6 outside of the input coupling portion 1E
SH Radiation emitted by the display 11 and perceived by the observer 6 within the input coupling portion

What is claimed is:

1. A waveguide, comprising:
a partly transparent input coupling portion;
an output coupling portion spatially distant from the input coupling portion in a lateral direction;
a main body that is substantially transparent outside of the input coupling portion and outside of the output coupling portion, the transparent main body having a front side and a back side;
a diffractive input coupling structure in the input coupling portion,
an output coupling structure in the output coupling portion;
the diffractive input coupling structure being configured to only partially diffract radiation coming from an object to be detected and being incident on a front side of the waveguide in the input coupling portion such that the diffracted part, as input coupled radiation, propagates up to the output coupling portion in the main body by reflection,
the output coupling structure deflecting at least some of the input coupled radiation incident thereon, in such a way that the deflected part of the input coupled radiation, as output coupled radiation, emerges from the main body in the output coupling portion via the front side or the back side of the main body; and
the diffractive input coupling structure having a diffraction efficiency, wherein the diffraction efficiency has a maximum efficiency at a prescribed location within the diffractive input coupling structure, and from the prescribed location the diffraction efficiency continuously decreases to at least two edges of the input coupling portion.

2. The waveguide as claimed in claim 1, wherein the diffractive input coupling structure has an imaging effect.

3. The waveguide as claimed in claim 1, wherein the diffraction efficiency has a Gaussian or super-Gaussian profile.

4. The waveguide as claimed in claim 1, wherein the diffractive input coupling structure is designed as an input coupling relief grating and/or the output coupling structure is designed as an output coupling relief grating.

5. The waveguide as claimed in claim 4, wherein a profile depth of the input coupling relief grating reducing toward the edge leads to the diffraction efficiency that reduces toward the edge.

6. The waveguide as claimed in claim 4, wherein a profile shape of the input coupling relief grating changing toward the edge leads to the diffraction efficiency that reduces toward the edge.

7. The waveguide as claimed in claim 4, wherein the input coupling relief grating comprises a blazed grating.

8. The waveguide as claimed in claim 7, wherein a slope of the blazed grating changing toward the edge leads to the diffraction efficiency that reduces toward the edge.

9. The waveguide as claimed in claim 1, wherein the diffractive input coupling structure and/or the output coupling structure is in the form of an input coupling structure or output coupling structure respectively buried in the main body, or the diffractive input coupling structure and/or the output coupling structure is formed on a surface of the main body.

10. The waveguide as claimed in claim 1, wherein the main body is provided with an input coupling coating on its back side, at least within the input coupling portion, the refractive index of the material of the input coupling coating is greater than the refractive index of the material used to manufacture the main body.

11. The waveguide as claimed in claim 10, wherein a varying layer thickness of the input coupling coating, in particular a layer thickness reducing toward the edge, leads to the diffraction efficiency that reduces toward the edge.

12. The waveguide as claimed in claim 1, wherein a back side adhesive laminate with at least one first back side adhesive layer is arranged on the back side of the main body and/or the input coupling portion, the first back side adhesive layer is arranged on a side of the back side adhesive laminate that faces the main body.

13. An image reproduction apparatus, wherein the image reproduction apparatus comprises:
    a waveguide as claimed in claim 12; and
    a display with an image reproduction area, the display connected to the waveguide by means of the back side adhesive laminate, wherein the output coupling portion is arranged outside of the image reproduction area of the display, and the input coupling portion is arranged within the image reproduction area of the display.

14. The image reproduction apparatus as claimed in claim 13, wherein the image reproduction apparatus comprises a camera arranged outside of the image reproduction area, the camera including at least one sensor for capturing the output coupled radiation.

15. The image reproduction apparatus as claimed in claim 13, wherein the apparatus is a smartphone, a tablet computer, a desktop computer, a notebook computer, a video phone or a terminal of an intercom system.

16. The waveguide as claimed in claim 1, wherein the diffractive input coupling structure has a converging effect.

* * * * *